(12) United States Patent
Bech

(10) Patent No.: US 9,995,273 B2
(45) Date of Patent: Jun. 12, 2018

(54) METHOD AND AN APPARATUS FOR PROVIDING A TAPERED EDGE ON A SHEET COMPRISING A FIBROUS MATERIAL

(71) Applicant: Vestas Wind Systems A/S, Aarhus N. (DK)

(72) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 542 days.

(21) Appl. No.: 14/410,928

(22) PCT Filed: Jun. 20, 2013

(86) PCT No.: PCT/DK2013/050205
§ 371 (c)(1),
(2) Date: Dec. 23, 2014

(87) PCT Pub. No.: WO2014/000742
PCT Pub. Date: Jan. 3, 2014

(65) Prior Publication Data
US 2015/0377210 A1   Dec. 31, 2015

Related U.S. Application Data

(60) Provisional application No. 61/663,982, filed on Jun. 25, 2012.

(30) Foreign Application Priority Data

Jun. 25, 2012  (DK) .................................. 2012 70360
Jan. 28, 2013  (GB) .................................. 1301430.3

(51) Int. Cl.
*B24B 49/14*   (2006.01)
*F03D 1/06*    (2006.01)
(Continued)

(52) U.S. Cl.
CPC .............. *F03D 1/0675* (2013.01); *B24B 9/20* (2013.01); *B24B 19/14* (2013.01); *B24B 55/02* (2013.01);
(Continued)

(58) Field of Classification Search
CPC .................................. B24B 49/14; B24B 9/20
(Continued)

(56) References Cited

FOREIGN PATENT DOCUMENTS

EP   1184130 A1   3/2002
EP   1348523 A2   10/2003
(Continued)

OTHER PUBLICATIONS

International Searching Authority, International Search Report and Written Opinion issued in corresponding Application No. PCT/DK2013/050205, dated Oct. 8, 2013, 9 pages.
(Continued)

*Primary Examiner* — Robert Rose
(74) *Attorney, Agent, or Firm* — Wood Herron & Evans LLP

(57) ABSTRACT

The invention provides a method of providing a tapered edge on a sheet comprising a fibrous material, comprising moving the sheet while carrying out the following steps: —moving the sheet past a freezing device, which sheet is provided with a substance embedding the fibrous material, at least at a first edge of the sheet, which substance is in a non-solid state at room temperature, in particular at 20 degrees Celsius, and cooling the first edge using the freezing device, so that the substance at the first edge becomes solid, —moving the sheet past a machining device while the substance is solid from the cooling using the freezing device, and —machining, during the step of moving the sheet past a machining device, the first edge with the machining device to provide a first tapered edge.

21 Claims, 8 Drawing Sheets

(51) Int. Cl.
  *B24B 9/20* (2006.01)
  *B24B 19/14* (2006.01)
  *B24B 55/02* (2006.01)
  *B29C 70/54* (2006.01)
  *B29C 70/02* (2006.01)
  *B29D 99/00* (2010.01)

(52) U.S. Cl.
  CPC .......... *B29C 70/021* (2013.01); *B29C 70/545* (2013.01); *B29D 99/0025* (2013.01); *Y02E 10/721* (2013.01)

(58) Field of Classification Search
  USPC ............................................... 451/53, 7, 449
  See application file for complete search history.

(56) References Cited

FOREIGN PATENT DOCUMENTS

| | | |
|---|---|---|
| GB | 2482342 A | 2/2012 |
| GB | 2482344 A | 2/2012 |
| GB | 2482345 A | 2/2012 |
| GB | 2490469 A | 10/2012 |
| WO | 8402451 A1 | 7/1984 |

OTHER PUBLICATIONS

Intellectual Property Office, Combined Search and Examination Report issued in corresponding Application No. 1301430.3, dated May 13, 2013, 9 pages.

METHOD AND AN APPARATUS FOR PROVIDING A TAPERED EDGE ON A SHEET COMPRISING A FIBROUS MATERIAL

TECHNICAL FIELD

The present invention relates to a method and an apparatus for providing a tapered edge on a sheet comprising a fibrous material. The tapered fibrous material may be used to manufacture a wind turbine blade.

BACKGROUND

This invention relates to techniques for chamfering layers or plies, herein commonly referred to as sheets, used in composite structures, such as wind turbine blades.

Composite structures typically comprise one or more sheets, herein also referred to as plies, each ply being a fibre-reinforced sheet that may comprise a thermoplastic or thermosetting resin matrix. The fibres may be pre-impregnated with the matrix as a 'prepreg' or the matrix may be impregnated into a fibre sheet during fabrication of a composite structure, for example during lay-up or injection-moulding procedures. Alternatively, the fibre-reinforced sheet may be pre-impregnated on just one side by a resin foil, i.e. a 'semi-preg'. As a further alternative, the fibrous material can be embedded with the laminate matrix resin by a vacuum assisted transfer into a dry fibrous material layup, e.g. such as in VARTM (Vacuum assisted resin transfer molding). The resin normally used is a thermosetting resin, which drops in viscosity when heated and later rises to become solidified, when curing at continued heating.

Plies are commonly laid atop one another in a layered or laminated arrangement. Single-ply composite structures are also possible, with single-thickness plies overlapping at their edges. The plies can be supported by a foam core to define a skin on or around the core, e.g. to provide a sandwich structure.

In wind turbine blades, the structure is usually tapered in both the spanwise direction from blade root to blade tip and in the chordwise direction. To achieve this, some plies may be terminated or 'dropped' inward of an extremity of the structure, leaving other continuous plies to extend further toward that extremity. However, such ply-drops may cause weaknesses in the laminate, in turn causing damage such as delamination or cracks. Edge chamfering is helpful to straighten the load path and to maximise the surface area of the interface between plies. This allows thicker plies to be used, which facilitates the lay-up process because fewer layers are then required in the laminate to achieve a required overall thickness.

Plies for use in composite structures are difficult to chamfer efficiently, accurately and repeatably, particularly with the shallow taper angle that is desirable to maximise the surface area of the edge interface. The plies are flexible and compressible and so tend to move unpredictably under the forces applied by the chamfering process. Also, the plies may degrade with heat generated by the chamfering process. This is a particular problem with prepregs, if the matrix cures or otherwise transforms with heat. For example, heat generated during chamfering may cause the thermoplastic matrix to soften or melt and clog the chamfering tool. If the matrix softens or melts, it is also possible for the chamfering tool to drag the ply unpredictably, possibly distorting it and so undermining the accuracy of cutting.

Some examples of ply-tapering tools are disclosed in EP1786617. These include finger cutters akin to hair trimmers, but finger cutters are not suitable for cutting prepregs in which the fibres are embedded in a matrix because the close integration of the fibers in a prepreg ply prevents the fingers from penetrating between the fibres. Also, in sheets of dry fiber, in which the fibres are held together, e.g. by stitching, and oriented at various angles, the fingers would be prevented from penetrating between the fibres. EP1786617 also discloses milling cutters with inclined faces, turning about an axis orthogonal to a plane containing the edge being tapered. When configured as shown in EP1786617, milling cutters impart heat to a prepreg ply that may degrade the ply and melt its matrix; this is also a problem suffered by other abrading techniques, using a belt grinder or the like. Also, in a dry fiber ply, when configured as shown in EP1786617, milling cutters impart a side force to the ply, parallel to the tapered edge, that tends to distort the ply, and individual fibers in it, and so undermines the accuracy of cutting.

WO2012013193 discloses a technique where a prepreg ply is clamped between refrigerated steel blocks, a grinding wheel is arranged to translate across a free edge of the ply to remove material from that edge to create a chamfer, and a nozzle supplying refrigerant is arranged to move in tandem with the grinding wheel. Although this is a promising technique, there is still room for improvement, in particular to facilitate large scale manufacturing, e.g. of wind turbine blades. Hence, there is a need for a process for chamfering edges of fibrous material sheets in a controlled manner and in a consistent quality suitable for blade manufacturing in high numbers.

SUMMARY

An object of the invention is to provide a technique for chamfering edges of fibrous material sheets in a controlled manner and in a consistent quality suitable for large scale manufacturing, e.g. of wind turbine blades. Another object of the invention is to facilitate reducing the risk of ply-drops causing weaknesses in laminates in a wind turbine blades.

These objects are reached with a method of providing a tapered edge on a sheet comprising a fibrous material. The method comprises moving the sheet while carrying out the following steps:

moving the sheet past a freezing device, which sheet is provided, at least at a first edge of the sheet, with a substance embedding the fibrous material, which substance is in a non-solid state at room temperature, in particular at 20 degrees Celsius, cooling the first edge using the freezing device, so that the substance at the first edge becomes solid, moving the sheet past a machining device while the substance is solid from the cooling using the freezing device, and machining, during the step of moving the sheet past a machining device, the first edge with the machining device to provide a first tapered edge.

The fibrous material may be any type suitable for a wind turbine blade, such as woven or layered triax, biax, unidirectional etc. Also, the fibers may be of any type, e.g. glass, carbon, etc. The substance embedding the fibrous material means the substance impregnating the fibrous material.

The invention provides for the substance to be kept solid while being machined with the machining device, so that a part of the first edge can be machined off, to create a taper, without the risk of the substance contaminating any part of the machining device. The sheet may comprise a pre-preg material where the substance is matrix resin. Due to the normal stickiness of pre-preg material, this is especially difficult to machine without the tooling becoming covered in the resin material. This is avoided when the resin is kept solid according to the invention. Also, the machining tends to introduce heating due to friction and tearing forces, but the invention will counteract this phenomenon. Thus, where the substance is a resin, the first edge can be tapered without the risk of the resin being damaged or starting to cure during the machining.

As exemplified below, the substance could also comprise water or be water, e.g. demineralised water, for use when tapering dry fiber plies, where the water is provided temporarily to stabilise the fibers during machining, e.g. the water will work as a carrier to facilitate grinding of dry fibers, since the water is kept frozen while being machined. This makes it possible for precise tapers may be manufactured. Of course the substance should be provided to the sheet before the substance is passed by the freezing device. The impregnation can be done at an impregnation station upstream of the cooling device, and preferably, the water impregnation is done only at the edges of the sheet, along which the tapering machining is to be carried out. Alternatively, where the sheet is provided as a web in a roll, the water can be provided while the web in still on the roll, e.g. by submerging the entire roll in water, or pouring water onto the roll.

Preferably, cooling the first edge is carried out simultaneously as moving the sheet past a freezing device. The sheet is preferably arranged to be horizontally flat, and with the first edge parallel to the sheet movement direction, as the sheet passes the freezing and machining devices. Since the sheet is moved during said method steps, the freezing device and the machining device can be stationary. This in turn allows for large scale manufacturing since the processing of very long sheets is possible. For example, the sheet can be a web provided as a roll of material, and the sheet can be rolled off the roll as the steps of moving the sheet past the freezing device and the machining device are carried out. The sheet can then be moved continuously off the roll and past the freezing device and the machining device. This means of course that, at any given moment in time during the process, the substance will be non-solid in a part of the first edge that has not yet reached the freezing device, and the substance will be solid in a part of the first edge that is machined by the machining device. To be clear: The substance is solid, from the cooling using the freezing device, while the substance passes the machining device.

The substance being in a non-solid state at room temperature, in particular at 20 degrees Celsius, means that it is above its glass transition temperature ($T_g$); it is then e.g. in a fluid or a semi-fluid state. When cooled the substance becomes solid, which here means that it is below its glass transition temperature. More generally, the substance has a first viscosity at a first temperature, in particular room temperature, above the glass transition temperature of the substance, and a second viscosity at a second temperature, below the glass transition temperature of the substance. In particular, the first viscosity corresponds to a solid state of the substance, and the second viscosity corresponds to a non-solid state of the substance.

For cases where the substance is an epoxy resin, the glass transition temperature of uncured epoxy varies somewhat depending on the type of resin used. Maintaining the temperature of the resin below its uncured glass transition temperature during tapering (chamfering) of the sheet ensures that the resin remains hard during the chamfering process. The glass transition temperature of the uncured resin may also be referred to in the art as the 'cold $T_g$' or the 'uncured $T_g$', and is an intrinsic property of the resin that will vary from material to material. Put simply, the cold/uncured $T_g$ is the glass transition temperature of a matrix that has reacted at ambient temperature, and hence exhibits a relatively low degree of cross-linking. For epoxy resins typical uncured $T_g$ values can be between −15° C. and +5° C. For semisolid Bisphenol A Epoxy Resins for pre-preg, the cold/uncured $T_g$ is often around −2° C. A resin marketed by Hexcel Composites as HexPly® M9.6G has an uncured $T_g$ of +2° C. As a matrix ages, some additional cross linking will occur, causing the cold $T_g$ to increase slightly with time. In comparison, when a matrix is cured at an elevated temperature, it will exhibit a relatively high degree of cross-linking, resulting in the cured matrix having a much higher $T_g$, typically well in excess of 100° C.

Preferably, the method comprises heating a grinding surface of the machining device so that it is, during the step of machining, at a temperature above room temperature. Heating the machining device will, in case of the substance being an epoxy resin so that the sheet forms a pre-preg ply, prevent the epoxy from contaminating the machining device. The epoxy resin, being a thermosetting polymer, could be for example a Bisphenol A Epoxy Resin or a Bisphenol F Epoxy Resin. The reason that contamination is avoided is that the epoxy will obtain a low viscosity from the heating, and in this state, the epoxy will not be able to build up any significant amount of deposits on the grinding surface of the machining device. Instead the grinding surface will remain wet and clean of deposits. As described in more detail below, induction heating can be used to heat the grinding surface.

Where the substance is an epoxy resin, the step of heating the grinding surface can comprise heating the grinding surface so that it is, during the step of machining, at a temperature above 30 degrees Celsius, preferably above 40 degrees Celsius, more preferably above 50 degrees Celsius, and yet more preferably at least 60 degrees. Thereby, the grinding surface, and therefore the resin, can be heated so that it is, during the step of machining, at a temperature above a temperature interval at which the epoxy resin is semi-solid. Where the substance is an epoxy resin, the step of heating the grinding surface can comprise heating the grinding surface so that it is, during the step of machining, at a temperature below a cure onset temperature of the epoxy, for example below 100 degrees Celsius, or below 80 degrees Celsius. For example, said epoxy resin marketed by Hexcel Composites as HexPly® M9.6G has a cure onset temperature of 80° C., (cure cycle 80-120° C.), and where this resin constitutes the substance of the sheet to be machined, the grinding surface is suitably heated so that it is around 60 degrees Celsius.

It should be mentioned that the invention is applicable to pre-preg plies, but not only to those with epoxy resins, but also to pre-preg plies with any other type of resin suitable for pre-preg, such as a phenolic resin.

Preferably, the machining device comprises a rotatable first grinding wheel presenting the grinding surface, and the step of heating the grinding surface comprises heating the grinding wheel so that it is, during the step of machining, at a temperature above room temperature. The use of a heated grinding wheel has proven successful in trials made by the inventor. Alternatively, the grinding surface could be presented by some other type of machining device, for example a belt grinder. More generally, the machining device can comprise a grinding media which is heated so that it is, during the step of machining, at a temperature above room temperature.

In some embodiments, only the first edge is tapered. However, advantageously, the substance embedding the fibrous material can be provided also at a second edge of the sheet, located opposite to the first edge. The second edge can thereby be parallel with the first edge. The method can then further comprise cooling the second edge using the freezing device, so that the substance at the second edge becomes solid, and machining, during the step of moving the sheet past the machining device, the second edge with the machining device, to provide a second tapered edge.

Tapering both the first and second edges is said manner is particularly suited for said arrangement where the sheet is a web provided as a roll of material, and the sheet is rolled off the roll as the steps of moving the sheet past the freezing device and the machining device are carried out. The first and second edges could then be longitudinal edges of the web. The sheet can then be moved by means of a drive device, i.e. a motive unit, located downstream of the freezing device and the machining device, which drive device pulls the sheet off the roll and past the freezing device and the machining device. Alternatively a conveyor can simultaneously carry and move the material past the freezing device and the machining device. In both examples, the sheet would move continuously past the freezing device and the machining device.

The freezing device could comprise one unit for both the first and second edges or separate units for the first and second edges. Preferably, the freezing device presents a first cooling cavity enclosing the first edge, and optionally a second cooling cavity enclosing the second edge. Each cooling cavity can be provided in any suitable way, e.g. as a chamber or a channel. As exemplified below, the freezing device can comprise a cooler with a compressor connected to an evaporator, and conduits connecting the evaporator to the cooling cavity. Alternatively, the freezing device could be arranged to distribute a refrigerant directly onto the first edge. For example, a tetrafluoroethane refrigerant can be pumped and sprayed onto the sheet. It will of course be appreciated that other suitable refrigerants may be used for this purpose, for example liquid nitrogen or liquid carbon dioxide. Preferably, the first edge, and the substance therein, are cooled to a suitable temperature, e.g. −50° C.

The step of machining may involve any known material and substance removing process, including cutting, shearing, grinding, sawing, milling and/or ultrasound cutting. The machining device could comprise separate grinding or cutting units for the first and second edges. Preferably, the machining device comprises a first grinding wheel, and the step of machining the first edge comprises machining the first edge with the first grinding wheel. The first grinding wheel could be a high speed, diamond dressed tool, providing high speed impact to the individual fibres. At low speed the individual fibres tend to be cut by individual grinding, and this tends to move them during the process. As a result, the final cut of the material with be difficult to control and will divert from the desired tapered shape. Cutting the individual fibres with impact rather than grinding them allows for the cut to be made without the individual fibres moving during the cutting process. Thereby, it is possible to obtain a taper without distortion of the non-removed fibrous material and substance.

In an alternative to heating the machining device as described above, the method could comprise cooling the grinding surface of the machining device so that it is, during the step of machining, at a temperature at which the substance is solid. Preferably, the grinding surface is cooled so that the substance is, during the step of machining, at a temperature at which the substance is solid. More specifically, the grinding surface of the machining device can be cooled sufficiently below the cold $T_g$ of the substance so that the temperature of the substance is still below its cold $T_g$ when it is subjected to the friction heat from the machining action.

The cooling of the grinding surface could be accomplished by the grinding surface being presented by a hollow grinding wheel, and a stationary cooling device being placed in the grinding wheel. Alternatively, or in addition, the machining device can comprise a tool housing enclosing the first grinding wheel. Where the freezing device presents a first cooling cavity enclosing the first edge, the tool housing can communicate with the first cooling cavity. Thereby, the machining device is integrated with the freezing device so that the sheet edge can be kept cold during the grinding process.

Preferably, where the sheet is a web provided as a roll of material, the sheet is cut substantially transversely to a longitudinal direction of the web, (or transversely to the direction of movement of the sheet), into sheet sections, using a cutting device arranged downstream of the machining device. Preferably, the cuts are made so as to conform to the shape of a mould for a wind turbine blade. Thus, a plurality of the sheet sections can be placed in an elongated wind turbine blade shell mould, so that the sheet sections extend transversely in the mould with the first tapered edge oriented in the chordwise direction of a blade including the sheet sections. Thus, the sheet sections are placed in the mould so as to extend from a leading edge to a trailing edge of the blade. Thereby, as exemplified below, the tapered edges of the sheet sections will also extend in the chordwise direction of the blade, and preferably the sheets are placed so as to partly overlap to provide structurally stable joints between them.

Embodiments of the method are further defined in the detailed description below. The objects are also reached with a wind turbine blade comprising a fibrous material with a tapered edge provided by the method described herein.

In addition, the objects are reached with an apparatus for providing a tapered edge on a sheet comprising a fibrous material. The sheet is provided, at least at a first edge of the sheet, with a substance embedding the fibrous material, which substance is in a non-solid state at room temperature, in particular at 20 degrees Celsius, the apparatus comprising a freezing device and being adapted to move the sheet past the freezing device, the freezing device being adapted to cool the first edge so that the substance at the first edge becomes solid, the apparatus comprising a machining device and being adapted to move the sheet past the machining device, which machining device is adapted to machine, as the sheet is moved past the machining device and while the substance is solid from the cooling of the freezing device, the first edge to provide a first tapered edge.

Preferably, the apparatus comprises a heating device adapted to heat a grinding surface of the machining device so that it is, when the first edge is machined, at a temperature above room temperature.

In some embodiments, the freezing device presents a first cooling cavity adapted to enclose the first edge. Alternatively, or in addition, the freezing device can present a liquid coolant conduit adapted to carry a liquid and to extend along the first edge. Thus, the freezing device could include a system for a liquid, such as brine, being pumped through the liquid coolant conduit, cooling the conduit which in turn cools the first edge. As exemplified below, the freezing device can present a first liquid coolant conduit and a second liquid coolant conduit, both adapted to carry a liquid and to extend along the first edge, wherein the first and second liquid coolant conduit are located on opposite sides of the first edge.

Alternatively or in addition, the freezing device can present a thermoelectric cooler, such as a Peltier cooler, located at the first edge. As exemplified below, the freezing device can present a first thermoelectric cooler and a second thermoelectric cooler, both located at the first edge, wherein the first and second thermoelectric coolers are located on opposite sides of the first edge. Thereby, the first and second thermoelectric coolers can be combined with the first and second liquid coolant conduits, or the first cooling cavity, to provide a freezing device with a staged cooling arrangement. Thereby the sheet could pass a first stage with only the first and second liquid coolant conduits, or the first cooling cavity, and subsequently the sheet could pass a adjacent second stage with the thermoelectric coolers and the first and second liquid coolant conduits, or the first cooling cavity. In such a arrangement, the first stage could bring the temperature of the first edge to a first temperature, and the second stage could bring the temperature of the first edge to a second temperature being considerably lower than the first temperature.

Further embodiments of the apparatus are defined in the detailed description below.

The objects are also reached with a method of providing a tapered edge on a sheet comprising a fibrous material, the method comprising:
  providing the sheet with a substance embedding, at least at a first edge of the sheet, the fibrous material, which substance is in a non-solid state at room temperature, in particular at 20 degrees Celsius,
  cooling the first edge, for example by using a freezing device as described above, so that the substance at the first edge becomes solid,
  machining, while the substance at the first edge is solid from the cooling, the first edge with a machining device to provide a first tapered edge, and
  heating a grinding surface of the machining device so that it is, during the step of machining, at a temperature above room temperature.

The method can comprise the step of providing the substance to the sheet. It should be noted that when practicing the method according to this aspect of the invention, the sheet can be moved past the machining device, or the sheet can be stationary and supported in a suitable manner, while the machining device is moved during the step of machining. If the sheet is moved, a continuous process can be provided, in which, at a given point in time, some of the substance at the first edge is not cooled, and therefore non-solid, and some other part of the first edge is solid from the step of cooling.

Further embodiments of the method are defined in the detailed description below. The objects are also reached with a wind turbine blade comprising a fibrous material with a tapered edge provided by the method described herein.

The objects are also reached with an apparatus for providing a tapered edge on a sheet comprising a fibrous material, the apparatus comprising a machining device and being adapted to move the sheet past the machining device, which machining device comprises a rotatable first grinding wheel adapted to machine, as the sheet is moved past the machining device, a first edge of the sheet to provide a first tapered edge, wherein the first grinding wheel has a cylindrical grinding surface that is arranged so that a portion of the cylindrical grinding surface, that is in temporary contact with sheet during the machining of the first edge, moves in a direction which has a component that is pointing away from the sheet.

The temporary contact of the portion of the cylindrical grinding surface with the sheet is of course a result of the rotation of the grinding wheel. Said grinding surface portion appears locally at a region of contact between the grinding surface and the sheet. The movement, caused by the grinding wheel rotation, of said portion away from the sheet provides for moving the grinding dust in a direction away from the sheet, which facilitates keeping the sheet free from contamination and build-up of grinding material.

Preferably, the cylindrical grinding surface has an axis of rotation that is oriented at an angle to a direction of travel of the sheet past the machining device, which angle is larger than 0 degrees and smaller than 90 degrees, preferably 10-80 degrees. Preferably, for providing the first tapered edge, the axis of rotation of the grinding surface is oriented at an angle to an imaginary line, that is transverse to the direction of travel of the sheet past the machining device, which imaginary line also extends within a plane of the sheet as it passes the machining device, which angle is larger than 0 degrees and smaller than 90 degrees, preferably 1-30 degrees, more preferably 1-15 degrees.

Further embodiments of the apparatus are defined in the detailed description below.

DETAILED DESCRIPTION

Figure 1:
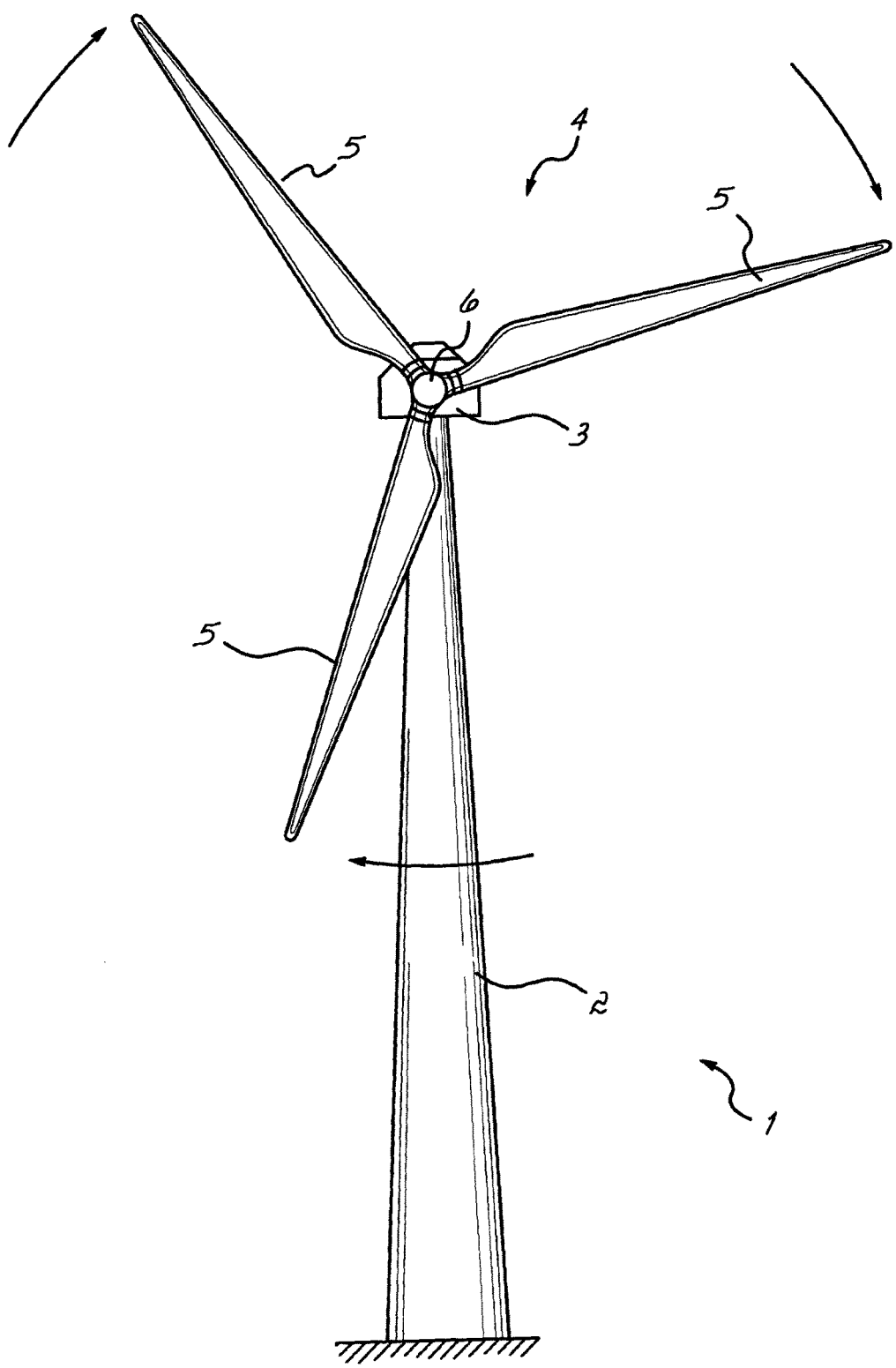
FIG. 1 shows a wind turbine from a front side, i.e. the side facing the wind.

FIG. 1 illustrates a wind turbine 1. The wind turbine comprises a wind turbine tower 2 on which a wind turbine nacelle 3 is mounted. A wind turbine rotor 4 comprising at least one wind turbine blade 5 is mounted on a hub 6. The hub 6 is connected to nacelle 3 through a low speed shaft (not shown) extending from the nacelle front. The wind turbine illustrated in FIG. 1 may be a small model intended for domestic or light utility usage, or may be a large model, such as those that are used in large scale electricity generation or on a wind farm for example. In the latter case, the diameter of the rotor could be as large as 100 meters or more.

Figure 2:
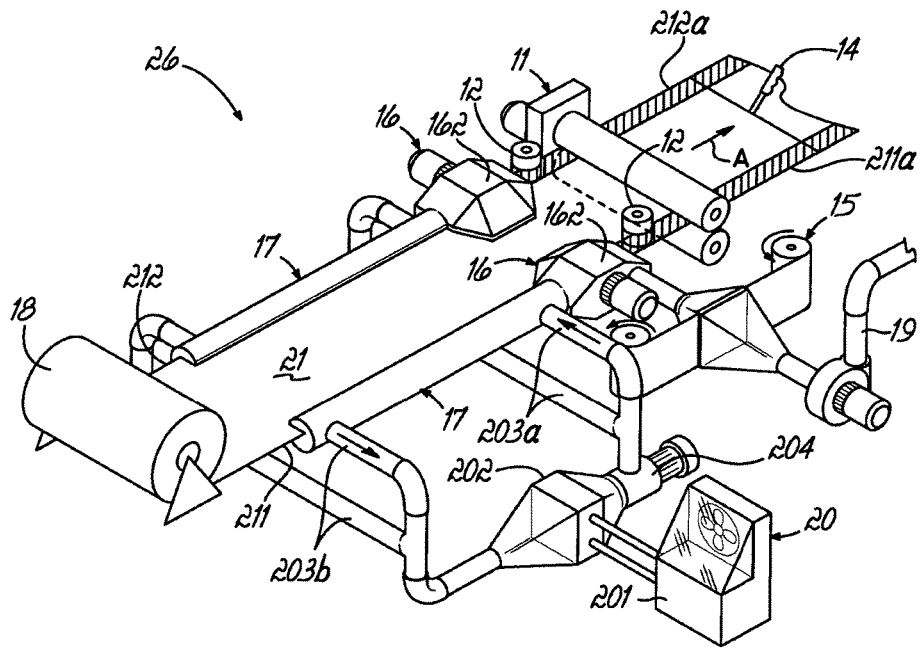
FIG. 2 shows a perspective view of an apparatus for machining and forming fibrous sheet-like material, here from a roll, where tapered, acute angles are made along the sides of the sheet like material.

FIG. 2 shows an apparatus 26 for forming a tapered angle in a sheet 21 comprising fibrous material for a wind turbine blade 4. The fibrous material is at least partly embedded in a substance. In this embodiment the substance is a resin, e.g. an epoxy resin; thus the sheet is provided in the form of a so called pre-preg material. One of the problems faced here, is to form an acute angle without distorting the sheet 21 or the fibrous material, as one purpose of the taper is to use it as part of a tapered overlap joint 23 as shown in FIG. 6b.

Below the method for using the apparatus 26 for providing the tapered edge on the sheet comprising the fibrous material will be described. The sheet 21 is provided as a web and is pulled from a roll 18 of prefabricated fibrous material, and is moved while the steps described below are carried out.

The sheet 21 is provided with the substance embedding the fibrous material, at least at a first edge 211 and a second edge 212 of the sheet, which substance is in a non-solid state at room temperature, in particular at 20 degrees Celsius. The sheet 21 is moved past a freezing device formed by two freezing sections 17, in communication with a cooler 20, described in more detail below. The freezing device 17 cools the first and second edges 211, 212 so that the substance at said edges becomes solid.

Integrated with the freezing device 17 is a machining device 16, herein also referred as tooling 16, described in more detail below. While the substance is solid from the cooling by the freezing device 17 the sheet 21 is moved past the machining device 16. The first and second edges 211, 212 are machined with the machining device 16 to provide a first and a second tapered edge 211a, 212a from the first and the second edge 211, 212, respectively. The tapered edges will be formed by removing parts of the fibrous and the substance. The tooling 16 is arranged so that the tapered edges form acute angles of between 1 to 15 degrees to the plane of the sheet 21. Where the machining device 16 is integrated with the freezing device 17, the machining can performed while the substance is kept solidified by the freezing device 17 acting along the first and second edges. Alternatively, the machining device 16 can be separate from, and located downstream of the freezing device 17, whereby the freezing and the machining steps are done sequentially.

Figure 2A:
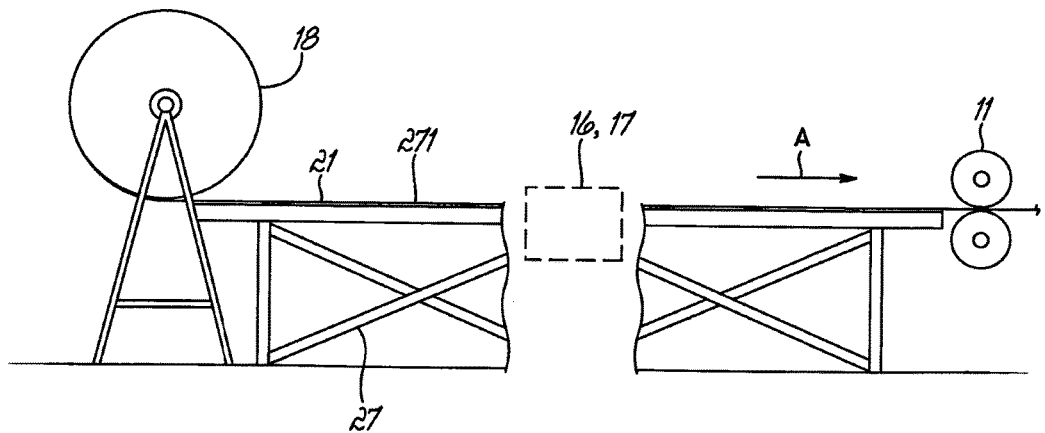
FIG. 2a shows a side view of the apparatus in FIG. 2, FIG. 2b and FIG. 2c show cross-sections of parts of the apparatus in FIG. 2, sectioned perpendicularly to a sheet transport direction indicated by an arrow A in FIG. 2.

As can be seen in FIG. 2a, for moving the sheet 21, the apparatus 21 is provided with a drive device 11 in the form of a puller 11 located downstream of the freezing sections 17 and the tooling 16, (indicated symbolically in FIG. 2a with a rectangle with broken lines). The puller 11 draws and advances the sheet 21 away from the roll 18 and past the freezing sections 17 and the tooling 16, in a sheet transport direction indicated by arrows A in FIGS. 2 and 2a. A support structure 27 with a support surface 271 for carrying the sheet 21 is provided. The support surface 271, preferably a metal surface, will support the sheet after it has been removed from the roll 18 and while it is moved past the freezing device 17 and the machining device 16. Of course as an alternative to the roll 18, the fibrous material could be provided in a number of sheets feed individually through the apparatus 26. As an alternative to the puller 11, the sheet(s) 21 could be transported past the tooling 16 and freezing sections 17 by a drive device in the form of a conveyor (not shown), such as a chain or belt conveyor, integrated in the support structure 27.

Figure 2B:
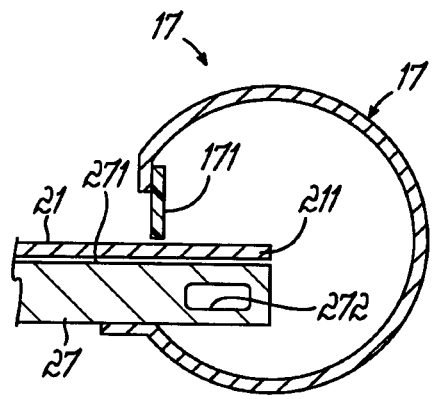

As can be seen in FIG. 2, the cooler comprises a compressor 201 connected to an evaporator 202. The freezing sections 17 comprises elongated elements extending along portions of edges of the support structure 27 (FIG. 2a) so as to enclose the edges 211, 212 of the sheet 21. FIG. 2b shows a cross-section of one of the freezer sections with a portion of the support structure 27 presenting the support surface 271 for the sheet 21. The freezer section 17 has a C-shaped cross-section where the lower distal end of the "C" is mounted to the support structure 27. The freezer section 17 thus presents a cooling cavity whereby it is designed to enclose cold gas, e.g. air, for cooling the edge 211 of the sheet 21. The upper distal end of the freezer section presents a lip 171, preferably in an elastic material such as rubber or in the form of a brush, sealing the interior of the freezer section 17. The lip is at its distal end in contact with the sheet.

Conduits 203a, 203b connect the evaporator to the freezing section 17, and a ventilator 204 is provided to circulate the gas from the evaporator 202 to the freezing sections 17 and back to the evaporator 202. The respective conduit 203a transporting gas to the respective freezing section 17 is connected to the freezing section 17 at a location which is at a distance from a location of a connection between the freezer section 17 and the respective conduit 203b transporting gas away from the freezer section 17. This allow for cold gas to be moved internally in the freezer sections along the sheet edge 211 to be cooled.

As can be seen in FIG. 2b, the support structure 27 can be provided with one or more internal cooling channels 272, which can enforce the cooling effect to the sheet edge 211. The cooling channels can communicate with the conduits 203a, 203b for receiving and evacuating the cooling gas.

The machining device 16 comprises two grinding tools 161, (one of which can be seen in FIG. 2c), one for each of the first and second edges 211, 212. Each grinding tool 161 is a rotational tool with a grinding wheel presenting a cylindrical abrading surface. The rotational axis of the tool 161 is oriented in parallel with the sheet transport direction, (indicated by arrow A in FIG. 2). The direction of the rotation, indicated with the arrow B in FIG. 2c, is such that the lower part of the tool surface, in contact with the sheet 21, moves away from an inner part of the sheet.

In alternative embodiments, the rotational axis of the tool 161 is oriented perpendicular to the sheet transport direction. In such embodiments, where the abrading surface of the grinding wheel is cylindrical, the rotational axis can be oriented in an angle to the plane of the sheet which the angle corresponds to the angle of the sheet taper to be obtained. Alternatively, where the rotational axis of the tool is oriented perpendicular to the sheet transport direction, it can be oriented in parallel with the plane of the sheet, and the sheet taper can be obtained by the abrading surface of the grinding wheel having the shape of a truncated cone.

Figure 2C:
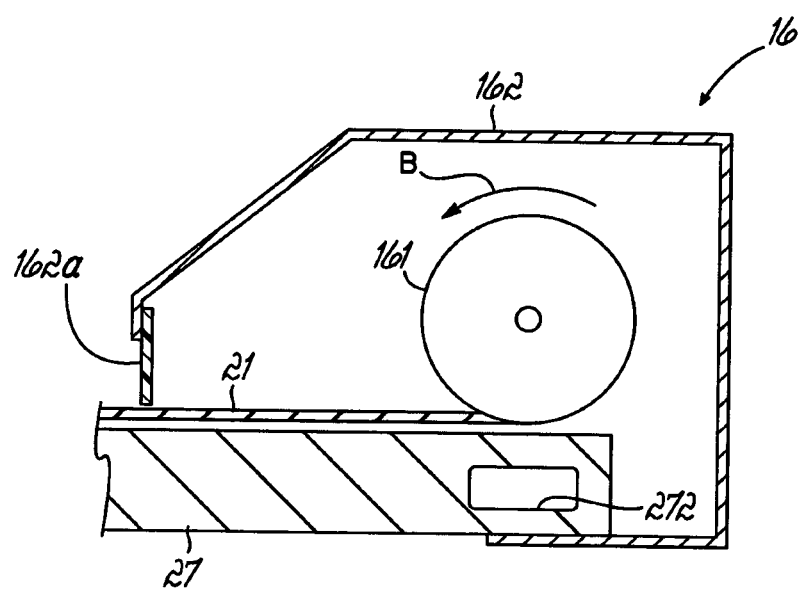

As can be seen in FIG. 2c, the each grinding tool 161 is housed in a respective tool housing 162, which communicates with the respective freezing section 17 and the respective conduit 203a transporting cold gas from the evaporator 202. The tool housing 162 is designed to enclose the cold gas for cooling the edge 211 of the sheet 21 while it is machined. An edge of the tool housing 162 presents a lip 162a, preferably in an elastic material such as rubber or in the form of a brush, sealing the interior of the tool housing 162. The lip is at its distal end in contact with the sheet 21.

As can be seen in FIG. 2c, in this embodiment, the internal cooling channel 272, described above with reference to FIG. 2b, extend into the region of the machining device.

The sheet 21 with the fibrous material and the substance can be machined essentially without distortion of the non-removed material and substance. This may be obtained by providing the tools 161 as high speed tooling having a cutting face with a diamond coating. Such a tool would cut the individual fibres by impact rather than grinding, whereby the risk of the fibres moving while being cut is reduced or eliminated.

Communicating with the tool housing 162 is a dust extractor 19, which includes a fan and extracts the gas from the tool housing 162 to remove dust obtained by the machining. The dust extractor is provided with a filter, in turn provided by a filter roll 15 arranged to supply fresh filter material. The filter material will catch particles down to a certain size. In FIG. 2, the dust extractor 19 is shown as emitting the extracted gas into the atmosphere. As an alternative the dust extractor 19 could communicate with the evaporator 202, so that air evacuated from the tool housing, and passed through the filter, is returned to the circuit to be cooled again and discharged to the freezing sections 17 and the tool housing 162.

As can be seen in FIG. 2, a quality inspection device 12, which could be provided as a wheel finger sensor or an optical camera, may be arranged after the machining device 16 to verify the result of the machining.

Figure 3:
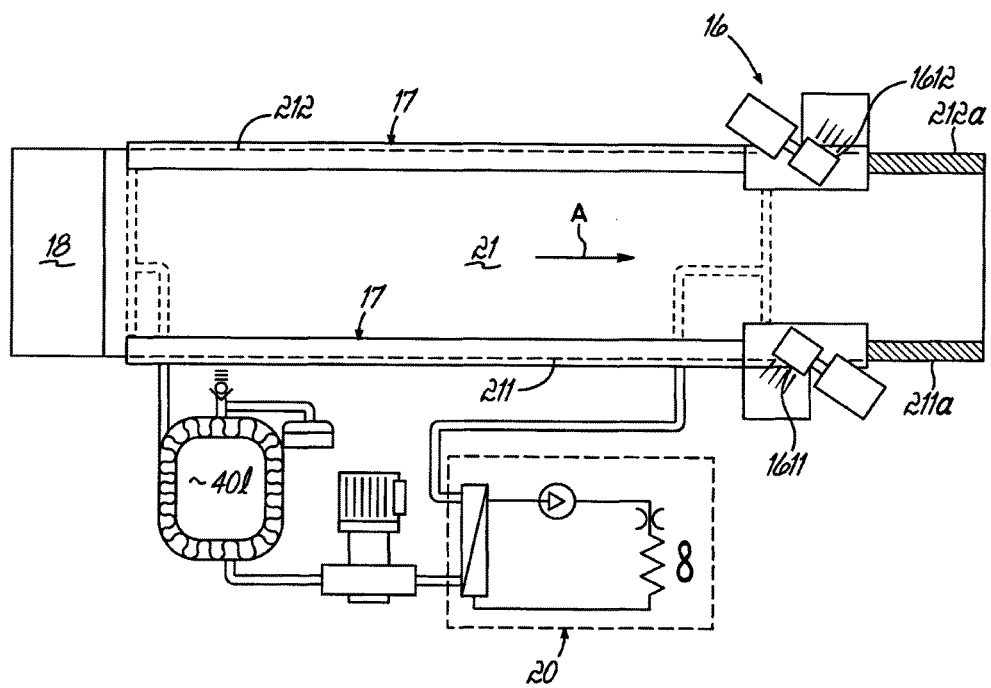
FIG. 3 shows a top view of an alternative apparatus for forming a tapered angle in a sheet comprising fibrous material

Reference is made to FIGS. 2 and 3. Downstream of the puller 11 is a cutter 14, arranged to cut the sheet 21 into sections 21a adapted for particular locations in a wind turbine blade shell mould (not shown). The sheet sections 21a could be arranged as described in the international application no. PCT/DK2012/050261 filed by the applicant. For example, the sheets sections 21a can be cut so that they obtain a lengthwise extension and a lateral extension being shorter than the lengthwise extension, and they can be laid in the blade mould such that they lengthwise are positioned in a direction corresponding to a chordwise direction of the blade mould and overlapping in a spanwise direction. Compared to laying up the fibrous material sheets in a traditional manner, with their lengthwise extension in the spanwise direction of the blade, a layup of fibrous material sheets in the chordwise direction in the manner proposed here reduces material waste significantly.

FIG. 3 shows a top view of an alternative apparatus for forming a tapered angle in a sheet 21 comprising fibrous material for a wind turbine blade 4. The apparatus in FIG. 3 has features in common with the apparatus described above with reference to FIG. 2, but here the important differences will described.

The sheet 21 is moved past a freezing device formed by two freezing sections 17, in communication with a cooler 20. The freezing sections 17 comprises elongated elements extending along portions of edges of the support structure.

Figure 3A:
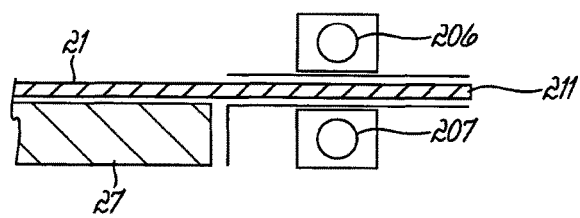
FIG. 3a shows a cross-section of parts of the apparatus in FIG. 3, sectioned perpendicularly to a sheet transport direction indicated by an arrow A in FIG. 3.

FIG. 3a shows a cross-section of one of the freezer sections with a portion of the support structure 27 presenting the support surface for the sheet 21. The freezing device presents a first liquid coolant conduit 206 and a second liquid coolant conduit 207, both adapted to carry a liquid and to extend along the first edge 211, wherein the first and second liquid coolant conduit are located on opposite sides of the first edge 211. Thus, the freezing device includes a system for a liquid, such as brine, being pumped through the liquid coolant conduits 206, 207, cooling the conduits which in turn cool the first edge 211.

Figure 3B:
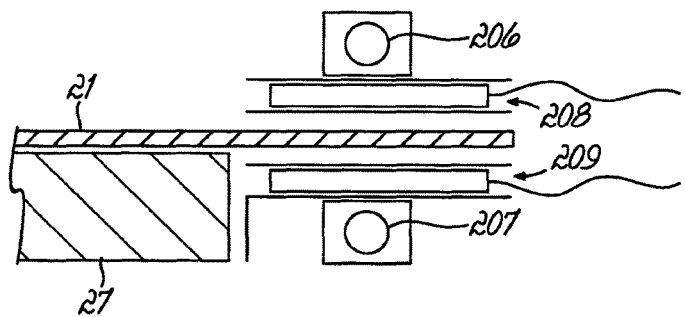
FIG. 3b shows a cross-section similar to the one shown in FIG. 3a, of parts of an apparatus according to yet another embodiment of the invention.
Figure 3C:
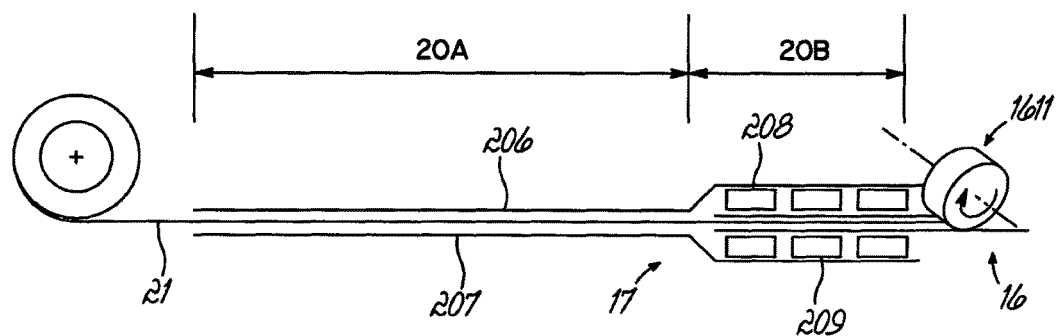
FIG. 3c shows a schematic side view of the apparatus, parts of which are shown in FIG. 3b

FIG. 3b and FIG. 3c show a modification of the embodiment in FIG. 3. FIG. 3b shows a cross-section of one of the freezer section, similar to the cross-section in FIG. 3a. As can be seen in FIG. 3b, in addition to the liquid coolant conduits 206, 207, the freezing device presents a first thermoelectric cooler 208 and a second thermoelectric cooler 209, both Peltier coolers. The first and second thermoelectric coolers 208, 209 are located on opposite sides of the first edge 211, and between the respective liquid coolant conduits 206, 207 and the first edge 211.

As can be seen in FIG. 3c, the first and second thermoelectric coolers 208, 209 are combined with the first and second liquid coolant conduits 206, 207, to provide a freezing device with a staged cooling arrangement. Thereby the sheet 21 passes a first freezer stage 20A with only the first and second liquid coolant conduits 206, 207, and subsequently the sheet passes a adjacent second freezer stage 20B with the thermoelectric coolers 208, 209 and the first and second liquid coolant conduits 206, 207. Thereby, the first freezer stage 20A brings the temperature of the first edge 211 to a first temperature, and the second freezer stage 20B brings the temperature of the first edge 211 to a second temperature being considerably lower than the first temperature.

In the embodiments in FIG. 3 and FIG. 3c, a machining device 16 is provided downstream of the freezing device 17. The machining device 16 comprises rotatable first and second grinding wheels 1611, 1612, by which the first and second edges 211, 212 are machined to provide a first and a second tapered edge 211a, 212a. The first and second grinding wheels 1611, 1612 have respective cylindrical grinding surfaces 1611a, 1612a.

Figure 4A:
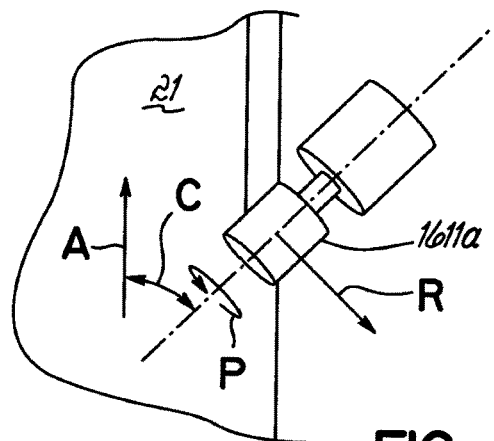
FIG. 4a shows a top view of a part of the apparatus in FIG. 3

As can be seen in FIG. 4a, each grinding surface is arranged so that a portion of the cylindrical grinding surface, that during rotation, which is indicated by the arrow P, is in temporary contact with sheet 21 during the machining of the first edge, moves in a direction, indicated by the arrow R in FIG. 4a, which has a component that is pointing away from the sheet 21. This movement provides for moving the grinding dust in a direction away from the sheet 21, which facilitates keeping the sheet 21 free from contamination and build-up of grinding material. As can be seen in FIG. 4a, the cylindrical grinding surface has an axis of rotation that is oriented at an angle C to a direction of travel of the sheet past the machining device, which angle C that is about 45 degrees. More generally, the angle C could be 10-80 degrees.

Figure 4B:
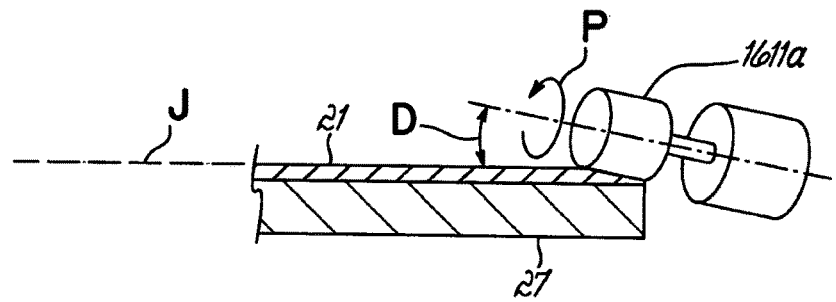
FIG. 4b shows a cross-section of the part in FIG. 4a, sectioned perpendicularly to a sheet transport direction indicated by an arrow A in FIG. 3.

As can be seen in FIG. 4b, for providing the tapered edge, the axis of rotation of the cylindrical grinding surface 1611a is oriented at an angle D to an imaginary line J, that is horizontal in FIG. 4b. I.e., the imaginary line J is transverse to the direction of travel of the sheet 21 past the grinding surface 1611a. The imaginary line J is also parallel to a plane of the sheet as it passes the grinding surface 1611a. The angle D is larger than 0 degrees and smaller than 90 degrees, preferably 1-30 degrees, more preferably 1-15 degrees.

Figure 5:
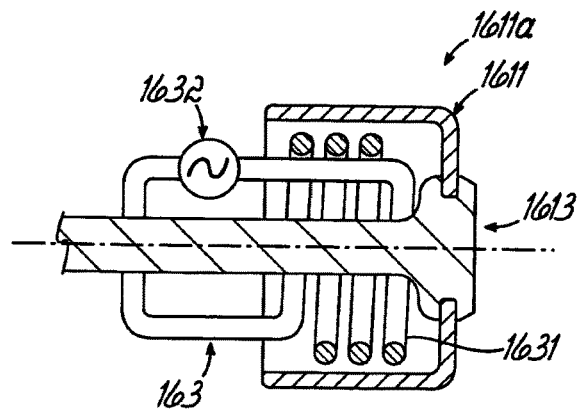
FIG. 5 shows a cross-sectional view of a part of a machining device of the apparatus in FIG. 3, where the section is parallel to a rotational axis of a grinding wheel of the machining device.

As can be seen in FIG. 5, the machining device comprises, in each grinding wheel 1611, 1612, a heating device 163 adapted to heat the grinding surface 1611a. The grinding wheel 1611 is mounted at its distal end to a shaft 1613. The heating device 163 comprises an induction heater, in turn comprising a coil 1631, which is stationary within the rotatable grinding wheel 1611. The coil 1631 is connected to a generator 1632 producing a alternating current in the coil 1631. Thereby, the coil 1631 creates induction heating so as to heat the grinding wheel 1611.

Where the substance in the sheet 21 is an epoxy resin, the grinding surface 1611a is heated so that it is, during the machining, at a temperature above a temperature interval at which the epoxy resin is semi-solid, but below the cure onset temperature of the epoxy resin. Where the epoxy resin is a Bisphenol A Epoxy Resin, a suitable minimum value for the grinding surface temperature is 60 degrees Celsius, and a suitable maximum value for the grinding surface temperature is 80 degrees Celsius.

The heating device will prevent the epoxy from contaminating the machining device. The reason is that the epoxy will obtain a low viscosity from the heating, and in this state, the epoxy will not be able to build up any significant amount of deposits on the grinding surface 1611. Instead the grinding surface will remain wet and clean of deposits.

Figure 6:
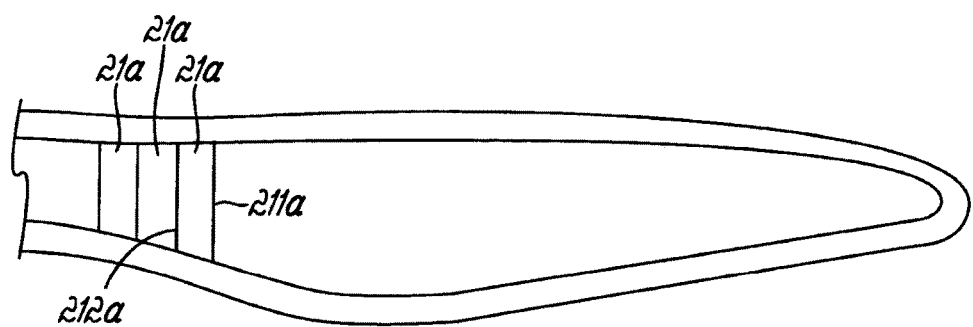
FIG. 6 shows a top view of a wind turbine blade mould with some material placed in it.
Figure 6A:
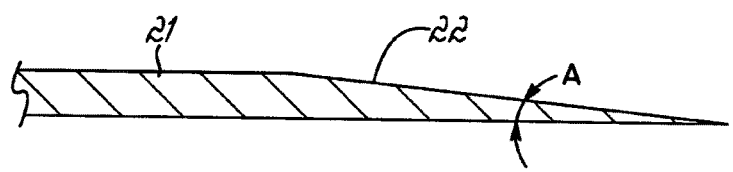
FIG. 6a shows an acute angle forming a taper on a piece of fibrous material.
Figure 6B:
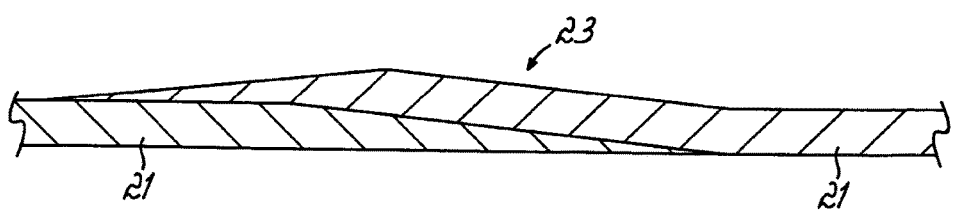
FIG. 6b shows a tapered overlap joint formed by two pieces of fibrous material, each having a taper.

As indicated in FIG. 6, as a result of the procedure described above, the first and second tapered edges 211a, 212a of each sheet section will extend in the chordwise direction of the blade. FIG. 6a shows a sheet 21 having a taper 22, obtained by an embodiment of the method according to the invention, with an acute angle A. The angle A is defined in relation to the plane of the sheet 21 and is between 1 and 15 degrees. FIG. 6b shows a tapered overlap joint 23 formed between two sheets 21, for example placed adjacent each other in the mould as shown in FIG. 6. The tapers will reduce the risk of stress concentrations, e.g. due to resin highways formed at ply drops with non-tapered sheet edges.

Figure 7:
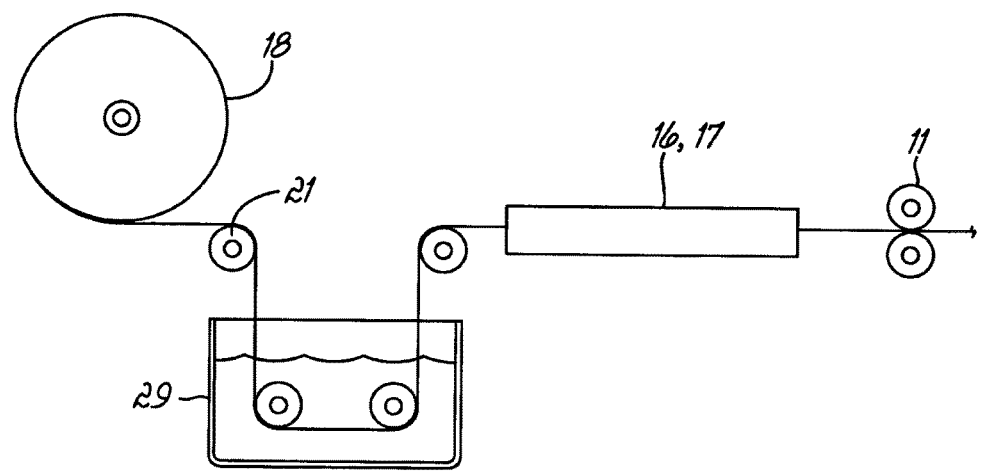
FIG. 7 shows a side view of an apparatus according to an alternative embodiment of the invention.

It will be appreciated that many modifications may be made to the techniques described above without departing from the scope of the present invention as defined by the accompanying claims. For example, it will be appreciated that the prepreg ply described by way of example above may be substituted for a semi-preg ply or other fibrous ply comprising a resinous matrix material. The invention can also be used to dry fiber sheets. In such a case, the substance in which the fibrous material is embedded can be water. As shown in FIG. 7, the dry fiber sheet 21 can be pulled from the roll 18 and guided through a water container 29 before is it moved through the freezing device 17 and the machining device 16. The freezing device will freeze the water impregnating the fibers. This will make it possible to machine the tapered edges without the individual fibers moving during the grinding process, since the frozen water will keep the fibers in their place. After the machining, the water may be vapourised, or separated from the fibrous material in any other way, e.g. by a suitable drying device.

Alternatively, on dry sheets, the water impregnation can be done only at the edges of the sheet, along which the tapering machining is to be carried out, so that a middle section of the sheet is left dry throughout the process.

The invention could be used for many different kinds on fiber orientations, e.g. such as in triax or unidirectional fibre sheets. In addition, whilst a grinding tool has been described above, it will be appreciated that the invention may be used in connection with any other machining tool or technique.

The invention has been illustrated by a description of various aspects and variants and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of the general inventive concept.

The invention claimed is:

1. A method of providing a tapered edge on a sheet comprising a fibrous material, comprising:
   providing the sheet with a substance embedding, at least at a first edge of the sheet, the fibrous material, which substance is in a non-solid state at room temperature,
   cooling the first edge so that the substance at the first edge becomes solid,
   machining, while the substance at the first edge is solid from the cooling, the first edge with a machining device to provide a first tapered edge, and
   heating a grinding surface of the machining device with a heating device so that the grinding surface is, during the step of machining, at a temperature above room temperature.

2. The method according to claim 1, wherein the cooling step further comprises
   moving the sheet past a freezing device.

3. The method according to claim 1, wherein the machining device comprises a rotatable first grinding wheel presenting the grinding surface, and the step of heating the grinding surface comprises heating the grinding wheel so that it is, during the step of machining, at a temperature above room temperature.

4. The method according to claim 2, wherein the substance embedding the fibrous material is provided also at a second edge of the sheet, located opposite to the first edge, the method further comprising cooling the second edge using the freezing device, so that the substance at the second edge becomes solid, and machining the second edge with the machining device to provide a second tapered edge.

5. The method according to claim 2, wherein the sheet is a web provided as a roll of material, and the sheet is rolled off the roll as the step of moving the sheet past the freezing device is carried out.

6. The method according to claim 5, wherein the first edge is a longitudinal edge of the web.

7. The method according to claim 5, wherein the sheet is moved by means of a drive device located downstream of the freezing device and the machining device, which drive device pulls the sheet off the roll and past the freezing device and the machining device.

8. The method according to claim 4, comprising cooling a grinding surface of the machining device so that it is, during the step of machining, at a temperature at which the substance is solid.

9. The method according to claim 2, wherein the freezing device presents a first cooling cavity enclosing the first edge.

10. The method according to claim 9, wherein the machining device comprises a first grinding wheel, and the step of machining the first edge comprises machining the first edge with the first grinding wheel, wherein the machining device comprises a tool housing enclosing the first grinding wheel, wherein the tool housing communicates with the first cooling cavity.

11. The method according to claim 1, comprising inspecting the first tapered edge with an inspection device located downstream of the machining device.

12. The method according to claim 1, wherein the sheet comprises a pre-preg material with the fibrous material, and the substance is a matrix resin.

13. The method according to claim 1, comprising the step of providing the sheet with the substance embedding the fibrous material, where the fibrous material comprises dry fibres and the substance comprises water.

14. The method according to claim 1, wherein the sheet is cut into sheet sections using a cutting device arranged downstream of the machining device.

15. The method according to claim 1, comprising cutting the sheet into a plurality of sheet sections, and placing a plurality of the sheet sections in an elongated wind turbine blade shell mould, so that the sheet sections extend transversely in the mould with the first tapered edge oriented in the chordwise direction of a wind turbine blade including the sheet sections.

16. The method according to claim 1, wherein the machining device comprises a rotatable first grinding wheel presenting the grinding surface, and the step of heating the grinding surface comprises heating the grinding wheel so that it is, during the step of machining, at a temperature above room temperature.

17. The method according to claim 1, wherein the substance is an epoxy resin, and the step of heating the grinding surface comprises heating the grinding surface so that it is, during the step of machining, at a temperature above 30 degrees Celsius.

18. The method according to claim 1, wherein the substance is an epoxy resin, and the step of heating the grinding surface comprises heating the grinding surface so that it is, during the step of machining, at a temperature below a cure onset temperature of the epoxy.

19. The method according to claim 1, wherein the machining step further comprises moving the sheet past a machining device.

20. The method according to claim 1, wherein the heating step further comprises using induction heating to heat the grinding surface.

21. The method according to claim 20, wherein the grinding surface is defined by a rotating grinding wheel, and the heating step further comprises using an induction coil which is stationary within the grinding wheel.

* * * * *